(12) United States Patent
Hutton et al.

(10) Patent No.: US 7,469,394 B1
(45) Date of Patent: Dec. 23, 2008

(54) TIMING VARIATION AWARE COMPILATION

(75) Inventors: Michael D. Hutton, Mountain View, CA (US); Yan Lin, Los Angeles, CA (US)

(73) Assignee: Altera Corporation, San Jose, CA (US)

( * ) Notice: Subject to any disclaimer, the term of this patent is extended or adjusted under 35 U.S.C. 154(b) by 161 days.

(21) Appl. No.: 11/502,320

(22) Filed: Aug. 9, 2006

Related U.S. Application Data (60) Provisional application No. 60/749,188, filed on Dec. 9, 2005.

(51) Int. Cl.
G06F 17/50 (2006.01)
G06F 9/45 (2006.01)

(52) U.S. Cl. .................... 716/6; 716/5; 716/18

(58) Field of Classification Search ............ 716/5–16, 716/18
See application file for complete search history.

(56) References Cited

U.S. PATENT DOCUMENTS 6,901,564 B2 * 5/2005 Stine et al. .............. 716/4
7,181,717 B1 * 2/2007 Singh et al. ............. 716/16
7,308,381 B2 * 12/2007 Yonezawa et al. ........ 702/179

* cited by examiner

Primary Examiner—Thuan Do
Assistant Examiner—Nghia M Doan
(74) Attorney, Agent, or Firm—Townsend and Townsend and Crew LLP (57) ABSTRACT

Design compilation software uses statistical analysis techniques to account for variations in device attributes. A compilation phase determines statistical attributes of edges and other elements of device, such as the mean and variance values of attributes. A compilation phase evaluates the suitability of a potential configuration of the device using a cost function. The cost function can be based on one or more independent criteria of the design, such wiring or routing costs, timing costs, and power consumption costs. The compilation phase can include clustering, placement, and routing of the design. One or more of the cost function criteria can include statistical attributes of the device. The compilation software can use statistical attributes of the device to predict device yields for a design. The compilation software can also predict device yields of a design using devices of different speed bin classifications.

37 Claims, 7 Drawing Sheets

InitPlacementTemperatureRlimit(&S, &T, &Rlimit); 105
ComputeDelayVarianceMatrix(); 107
while (ExitCriterion () == False) { /* "Outer loop" */ 109
  SSTA(); 111
  Previous_Wiring_Cost =Wiring_Cost(S);
  Previous_STiming_Cost = STiming_Cost(S);    113
  while (InnerLoopCriterion () == False) { /* "Inner loop" */ 114
    Snew = GenerateViaMove (S, Rlimit); 115
    $\Delta$STiming_Cost=STiming_Cost(Snew)−STiming_Cost(S); 117
    $\Delta$Wiring_Cost =Wiring_Cost(Snew) -Wiring_Cost(S);
    $\Delta$C =$\lambda \cdot$($\Delta$STiming_Cost/Prev_STiming_Cost) +
    (1-$\lambda$)$\cdot$($\Delta$Wiring_Cost/Previous_Wiring_Cost);   119
    if ($\Delta$C < 0) {
      S = Snew /* Move is good, accept */   121
    }
    else {
      r = random (0,1);
      if (r < $e^{-\Delta C/T}$)   123
        S = Snew; /* Move is bad, accept anyway */
    }
  } /* End "inner loop" */
  UpdateTempRlimit(&T, &Rlimit); 127
} /* End "outer loop" *

TIMING VARIATION AWARE COMPILATION

CROSS-REFERENCES TO RELATED APPLICATIONS

This application claims priority to U.S. Provisional Patent Application No. 60/749,188 filed Dec. 9, 2005, which is incorporated by reference herein.

BACKGROUND OF THE INVENTION

The present invention relates to the field of programmable devices, and the systems and methods for programming the same. Programmable devices, such as FPGAs, typically includes thousands of programmable logic cells that use combinations of logic gates and/or look-up tables to perform a logic operation. Programmable devices also include a number of functional blocks having specialized logic devices adapted to specific logic operations, such as adders, multiply and accumulate circuits, phase-locked loops, and one or more embedded memory array blocks. The logic cells and functional blocks are interconnected with a configurable switching circuit. The configurable switching circuit selectively routes connections between the logic cells and functional blocks. By configuring the combination of logic cells, functional blocks, and the switching circuit, a programmable device can be adapted to perform virtually any type of information processing function.

The process of determining the configuration of a programmable device from a user-specified design is referred to as compilation. Typical compilation processes start with an extraction phase, followed by a logic synthesis phase, a clustering and placement phase, a routing phase, and an assembly phase. The extraction phase takes a user design, typically expressed as a netlist in a hardware description language such as Verilog or VHDL, and produces a set of logic gates implementing the user design. In the logic synthesis phase, the set of logic gates is permuted over the hardware architecture of the programmable device in order to match elements of the user design with corresponding portions of the programmable device.

The clustering phase partitions the design into subsets of components capable of being implemented by the logic cells and other of components of the programmable device. The placement phase assigns the subsets of components to specific logic blocks and other components of the programmable device. The routing phase determines the configuration of the configurable switching circuit used to route signals between these logic blocks and functional blocks, taking care to satisfy the user timing constraints as much as possible. In the assembly phase, a configuration file defining the programmable device configuration implementing the user design is created. The programmable device configuration can then be loaded into a programmable device to implement the user design. Programmable devices can be configured with the a user design during or after manufacturing.

The timing or propagation delay of signals through an electronic circuit is an important metric of circuit performance. Compilation software typically optimizes the configuration of a user design to minimize timing delays on critical signal paths, allowing the programmable device implementing the user design to operate as fast as possible. Users may provide design constraints, such as timing, power, area, and other constraints, which the compilation software will attempt to satisfy.

Optimizations in the logic synthesis, clustering, placement, and routing phases can determine whether a configuration of a design satisfies its design constraints and possibly make modifications to the configuration to achieve those constraints, for example by placing the elements of longer or critical paths more closely together, using alternative routing resources or by modifying the mapping of the logical functionality of the design to different gates. To optimize user designs, compilation software typically estimates the timing delays and other characteristics of potential configurations of the user design. Previous compilation software estimates timing delays of circuit signal paths as constant values.

However, the timing delays of signal paths in actual devices are not generally constant values. Timing delay values vary with the environment, such as temperature and voltage conditions, and on random manufacturing process fluctuations in the fabrication of the device. The variations in timing delays of signal paths, as well as other attributes such as power consumption, may be global, affecting all of the elements of a device, wafer, or lot uniformly; regional or spatial, affecting elements of a device in physical proximity equally; and/or randomized and local, affecting only a single element, such as a wire or transistor.

Prior compilation software can account for variability in devices using guard bands. Each element is assigned a single worst case attribute value for the purpose of computing longest-path (setup) criticality. For example, if the timing delay of a wire has a mean of 50 ps and a standard deviation (sigma) of 10 ps, the worst case timing delay of the wire may be set to 70 ps, which is two standard deviations from the mean and includes approximately 95% of the possible timing delays of the wire. This worst case guard band timing delay value can be used to optimize the design. However, this guard band is too conservative for long signal paths including many wires, because the probability of having a total timing delay outside of the timing limits is statistically negligible (e.g. $0.05^{20}$ is approximately 0). Conversely, this guard band is too aggressive for short signal paths with relatively few wires. Even if the probability of the total timing delay of a signal path is relatively small, such as 0.01%, a design will typically have millions of wires, which virtually guarantees that at least one short signal path in a design will have a total timing delay outside the guard band. In a similar manner, timing analysis may use a single best-case attribute value, e.g. on clock paths, for the shortest path delay for the purpose of computing hold-time violations.

Prior compilation software using guard bands typically concentrate their optimizations on a single timing-critical signal path. However, this ignores many near critical signal paths, which due to variances may become critical themselves.

It is therefore desirable for compilation techniques to better account for variations of device attributes in optimizing designs. It is further desirable for compilation techniques to provide improved yields for devices. It is also desirable for compilation techniques to provide yield estimates to designers for different speed grades of devices.

BRIEF SUMMARY OF THE INVENTION

An embodiment of the invention uses statistical analysis techniques to account for variations in device attributes. A characterization phase determines statistical attributes of wires, routing multiplexers, and other elements of device, such as the mean and variance values of attributes. A compilation phase evaluates the suitability of a potential configuration of the device using a cost function and potentially modifies the configuration accordingly. The cost function can be based on one or more independent criteria of the design, such wiring or routing costs, timing costs, and power consumption costs. One or more of the cost function criteria can include statistical attributes of the device. The compilation software can use statistical attributes of the device to predict device yields for a design. The compilation software can also predict device yields of a design using devices of different speed bin classifications.

In an embodiment, a method of determining an implementation of a design on an integrated circuit device comprises determining statistics of attributes of elements of the device and determining configuration information specifying at least a portion of a configuration of the design on the device. The configuration of the design associates portions of the design with at least a portion of the elements of the device. The embodiment of the method also comprises evaluating the suitability of the configuration according to at least one design criteria using the statistics of the attributes of the associated elements of the device, and selecting the configuration information in response to the configuration satisfying the at least one design criteria.

In an embodiment, the elements of the device are associated with signal paths of the device. In this context, an element of the device may include interconnect wires of metal, polysilicon, or any other material, programmable via layers, fuseable links, programmable routing connections, including elements such as pass transistors multiplexers or tri-state driver, any combination thereof, or any other elements of a device associated with carrying a signal. In an embodiment, the statistics of attributes include mean and standard deviation values of an attribute of elements comprising a signal path. The attributes of a signal path of the device may include a timing attribute, such as a timing slack value; and a power consumption attribute, such as a signal path switching probability. In embodiments of the invention, the compilation phases may include a clustering, placement, and/or routing phase.

In another embodiment, the method further comprises determining at least one predicted yield of the design using the device from the statistics of attributes of elements of the device and the configuration of the design associating the portions of the design with at least the portion of the elements of the device. In a further embodiment, the predicted yield may be determined with respect to at least one predefined speed bin of the device. In yet a further embodiment, the predicted yield is determined with respect to a guard band defined for a probability distribution function of the criticality of a signal path of the design. In yet a further embodiment, the desired yield is an input to the configuration method and optimization of the configuration is performed with the goal of that specified yield.

BRIEF DESCRIPTION OF THE DRAWINGS

The invention will be described with reference to the drawings, in which.

DETAILED DESCRIPTION OF THE INVENTION

An embodiment of the invention improves compilation phases such as placement, clustering, and routing by considering the statistical distributions of timing delays and other attributes on signal paths, rather than single attribute values. This embodiment attempts to maximizes the statistical probability of satisfying design constraints, such as timing and power consumption, rather than optimizing only the single worst signal path.

Figure 1:
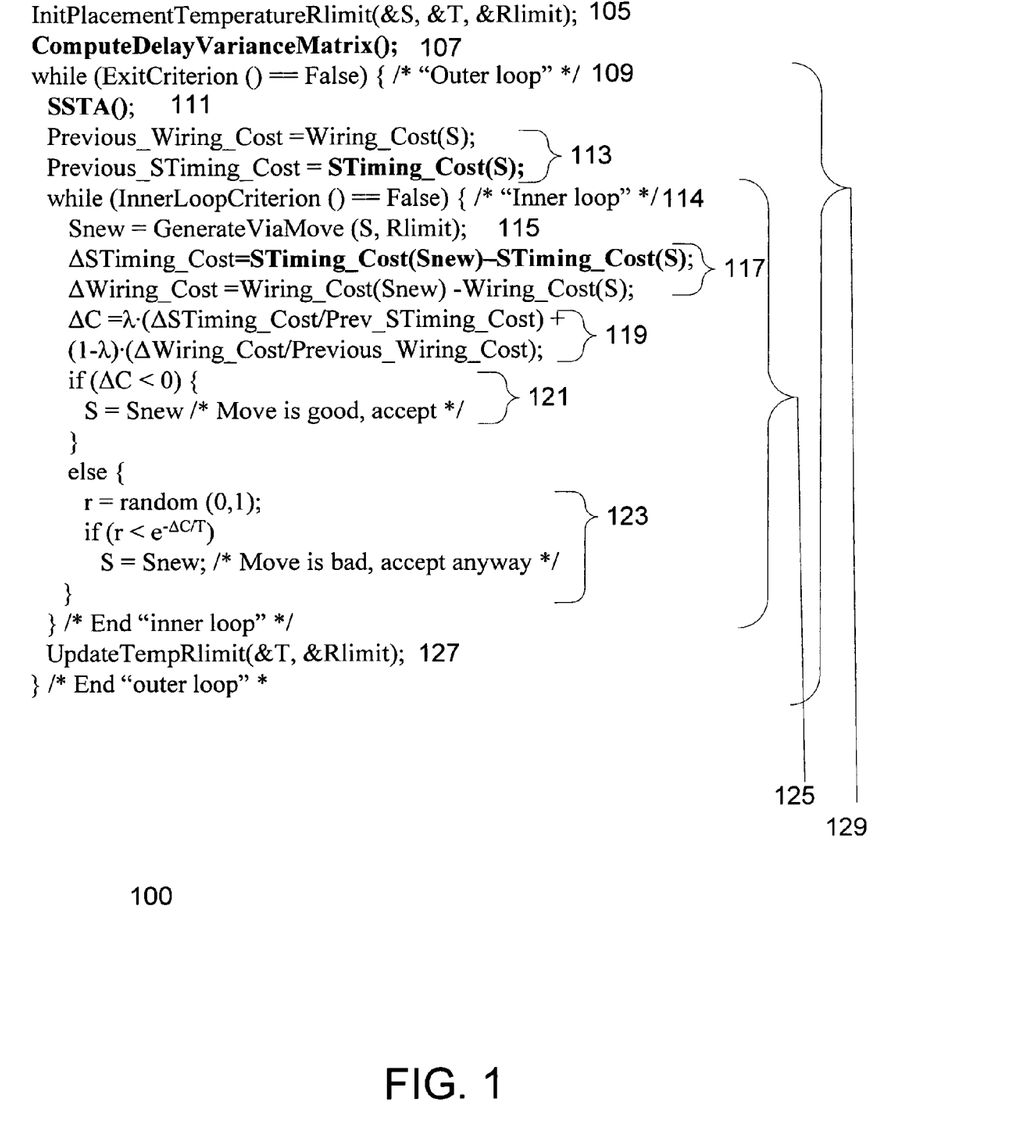
FIG. 1 illustrates example pseudo-code of a placement algorithm according to an embodiment of the invention.

FIG. 1 illustrates example pseudo-code 100 of a placement algorithm according to an embodiment of the invention. In an embodiment, the placement algorithm uses a simulated annealing technique to assign clusters of atoms or other portions of the design to specific locations on the device. Typically, simulated annealing determines an initial placement of clusters of the design. From this initial placement, the compilation software selects pairs of clusters randomly or deterministically and swaps their assigned locations. The compilation software then evaluates the suitability of this modified placement. The modified placement is either accepted and saved or rejected, in which case the prior placement is saved. The compilation software then repeats this swapping and evaluation for additional clusters using the most-recently saved placement as a starting point. The use of simulated annealing as a base algorithm is exemplary, and other placement algorithms such as recursive partitioning, analytic or force-directed placement could be modified according to the principles of the current invention.

Accordingly, pseudo-code 100 begins with instruction 105, which determines an initial placement of the user design. Instruction 105 also sets an annealing temperature of the design, which specifies how many placement iterations will be performed. Instruction 107 determines a delay variance matrix, which specifies statistical information of the signal paths of the design. In an embodiment, the delay variance matrix specifies the nominal timing delay and variance values for each edge of the device. An edge is connection between two circuit nodes in a device. An edge may be comprised of a physical interconnect wire or a logical interconnect wire formed from a combination of programmable connections (such as programmable vias, pass transistor switches, tri-state buffers, and multiplexers) and one or more physical interconnect wires. A signal path includes one or more edges connecting a source, such as an input pin or register output, and a destination, such as a register input or an output pin.

In an embodiment, the delay variance matrix can be determined from simulations or testing of operating characteristics of the programmable device or other type of device. For example, simulations of a programmable device can determine nominal delay and delay variance values for the wires, transistors, and other circuit elements associated with edges in the device. In further embodiment, instructions similar to instruction 107 can determine similar variance matrices for other attributes of the design, such as power consumption.

In embodiments, the delay and delay variance values can be determined by simulation of numerous different physical effects that can occur during manufacturing or operation of the device. For example, variations in dopant atoms in oxide layers of silicon processing, variations in oxide layer thickness, and variations in rectangular structures caused by lithography processes can result in fluctuations in threshold voltage (Vt) or effective channel length (Left) in a transistor, which changes the delay properties of the transistor. Similarly, wires can vary in pitch as well as effects due to bends and mismatched vias between metal layers. The effects of these and other variations can be incorporated into the delay and delay variance values of the device.

Instruction 109 begins an outer loop of the placement algorithm. Instruction 111 uses the current placement and the annealing temperature to determine a static statistical timing analysis (SSTA) of the design. Static statistical timing analysis is a timing analysis technique well known in the art for determining the statistical timing properties of signal paths of the design.

In an embodiment, the static statistical timing analysis uses probability distribution functions of each edge and statistical computations of the sum and maximum of probability distribution functions to determine a resulting probability distribution function of the entire design. This technique is referred to as block-based SSTA. In an alternative embodiment, the design is simulated across random events using Monte Carlo methods (Monte Carlo based SSTA). In still further embodiments, other static statistical timing analysis methods that consider spatial correlation and non-Gaussian distributed random variables may be used.

Typically, static statistical timing analysis traverses the signal paths of the timing graph of the design forwards and/or backwards. Probability distribution functions of timing delay values for each edge are evaluated at each node of the graph to determine overall probability distribution function of timing delay values of each signal path of the design. Probability distribution functions can be represented as continuous or discrete functions.

Figure 2:
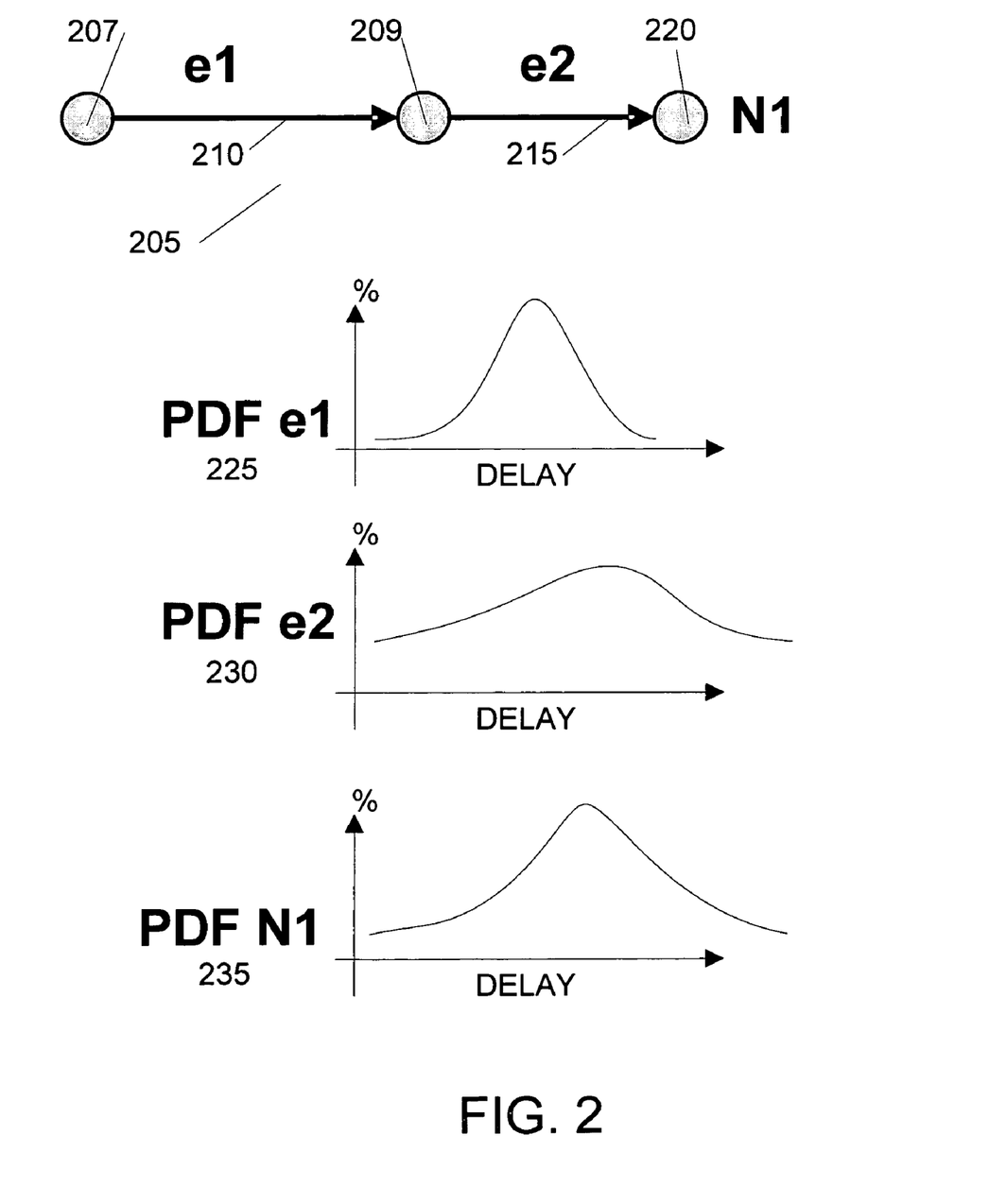
FIG. 2 illustrates an example application of statistical static timing analysis suitable for use with an embodiment of the invention.

FIG. 2 illustrates an example application 200 of statistical static timing analysis suitable for use with an embodiment of the invention. A signal path 205 includes two edges, e1 210 and e2 215. Edge e1 210 connects nodes 207 and 209 and edge e2 215 connects nodes 209 and N1 220.

Each edge 210 and 215 is associated with a probability distribution function of its timing delay values. In this example 200, edge e1 210 is associated with probability distribution function (pdf) 225 and edge e2 215 is associated with probability distribution function 230. The timing delay values for the entire signal path 205 can be determined from the sum of probability distributions 225 and 230. The timing delay values for the entire signal path 205 are shown as probability distribution function 235.

Similarly, if two or more edges connect with a single node, the combined timing delay values of the node is the probabilistic maximum of its edges' probability distribution functions. Similarly, subtraction and minimum operations can be applied to edges' timing delay probability distribution functions to determine minimum timing delays for signal paths.

In a further embodiment, delay with variation is modeled in a canonical first-order form $$a_0 + \sum_{i=1}^{n} a_i \Delta X_i + a_{n+1} \Delta R_a,$$

where $a_0$ is the nominal value, $\Delta X_i$ represents the variation for each global source of variation $X_i$, $a_i$ represents the sensitivity to each global variation, $\Delta R_a$ is the variation of an independent random variable $R_a$ from its mean value, and $a_{n+1}$ is the sensitivity or $R_a$. This canonical first-order form is a truncated approximation of a Gaussian distribution function. By scaling the sensitivities, $X_i$ and $R_a$ can be assumed as standard normal distribution $N(0,1)$. By expressing delay with variation in canonical form, max(A,B) is assumed as a normal distributed random variable where A and B are delays with variations in canonical form. The mean and variance of max(A,B) can be analytically calculated. Min(A,B) is also modeled as a normal distributed random variable with mean and variance being able calculated analytically. Add and subtract operations are computed based on tightness probability, i.e. the probability that one random variable is larger than another one.

In other embodimetns, the variation of delay or other attributes of device elements may be modeled in quadratic or higher-order canonical forms.

Returning to the pseudo-code example 100, following the determination of the static statistical timing analysis of the design, instructions 113 determine the wiring and timing costs of the current placement of the design. In an embodiment, the wiring cost is calculated as $$\text{Wiring\_Cost} = \sum_{i=1}^{N_{nets}} q(i) \cdot [bb_x(i) + bb_y(i)],$$

where $N_{nets}$ is the number of nets (wires) in the design. The cost of each net, i, is determined by its horizontal span, $bb_x(i)$, and its vertical span, $bb_y(i)$. The q(i) factor compensates for the fact that the bounding box wire length model underestimates the wiring needed by a net with more than three terminals.

In an embodiment, the timing cost of a placement of the design is STiming_Cost(i,j)=Mean_Delay(i,j)·SSTA_Criticality $(i,j)^{SSTA\_Crticality\_Exponent}$, where Mean_Delay(i,j) is the mean/nominal delay value for each connection (i,j) and SSTA_Criticality (i,j) is the probability that edge (i,j) is lying in a critical path. SSTA_Criticality (i,j), referred to generally as statistical criticality, is obtained from static statistical timing analysis performed by instruction 111 and is updated at each new annealing temperature. Criticality_Exponent is a constant parameter. The details of determining the criticality exponent value for an application are discussed below.

An inner loop that swaps cluster positions and evaluates their suitability begins with instruction 114. Instruction 115 selects pairs of clusters randomly or deterministically and swaps their assigned locations to create a modified placement. Instructions 117 determine the wiring and timing costs of the modified placements in a similar manner as instructions 113.

Instruction 119 determines an autonormalized cost difference between the original and modified placements. In an embodiment, this is $$\Delta C = \lambda \frac{\Delta \text{STiming\_Cost}}{\text{Previous\_STimingCost}} + (1-\lambda) \frac{\Delta \text{Wiring\_Cost}}{\text{Previous\_Wiring\_Cost}}.$$

where $\lambda$ is a trade-off variable between timing cost and wiring cost. In some applications, $\lambda=0.5$, so that these two costs are weighted equally. In alternate applications, different weights may be used.

The compilation software then evaluates the suitability of the modified placement. In an embodiment, instructions 121 accept the modified placement if $\Delta C$ is less than zero, indicating the total cost of the modified placement is less than the cost of the previous placement.

Conversely, if the total cost of the modified placement is greater than the cost of the previous placement, the modified placement may either be accepted or rejected based on a random value. In an embodiment, instructions 123 select a random number, R. Instructions 123 accept and saved the modified placement if $$R < e^{\frac{-\Delta C}{T}},$$

where ΔC is the auto-normalized cost and T is an annealing temperature, which decreases as the number of iterations of the placement algorithm increases. Otherwise, the modified placement is rejected and the prior placement is saved.

The compilation software then repeats loop 125 for further iterations of swapping and evaluating clusters using the most-recently saved placement as a starting point. Loop 125 is repeated until a stopping condition is met. Following loop 125, instruction 127 updates the annealing temperature. The updated annealing temperature will decrease the probability that a modified placement will be accepted even if its cost is more than the cost of the previous placement. Then loop 129 and inner loop 125 are repeated for subsequent evaluations of modified placements, until a final stopping condition is reached.

As discussed above, an embodiment of the timing cost includes a measurement of the statistical criticality of each edge in a design. The statistical criticality of an edge is the probability that the edge is part of a timing critical signal path. Statistical criticality of an edge can depend not only on the characteristics of the edge, but also on the characteristics of the path or paths containing the edge. For example, an edge that is in larger number of long paths may be more likely in critical path than a similar edge that is in smaller number of long paths.

Figure 3:
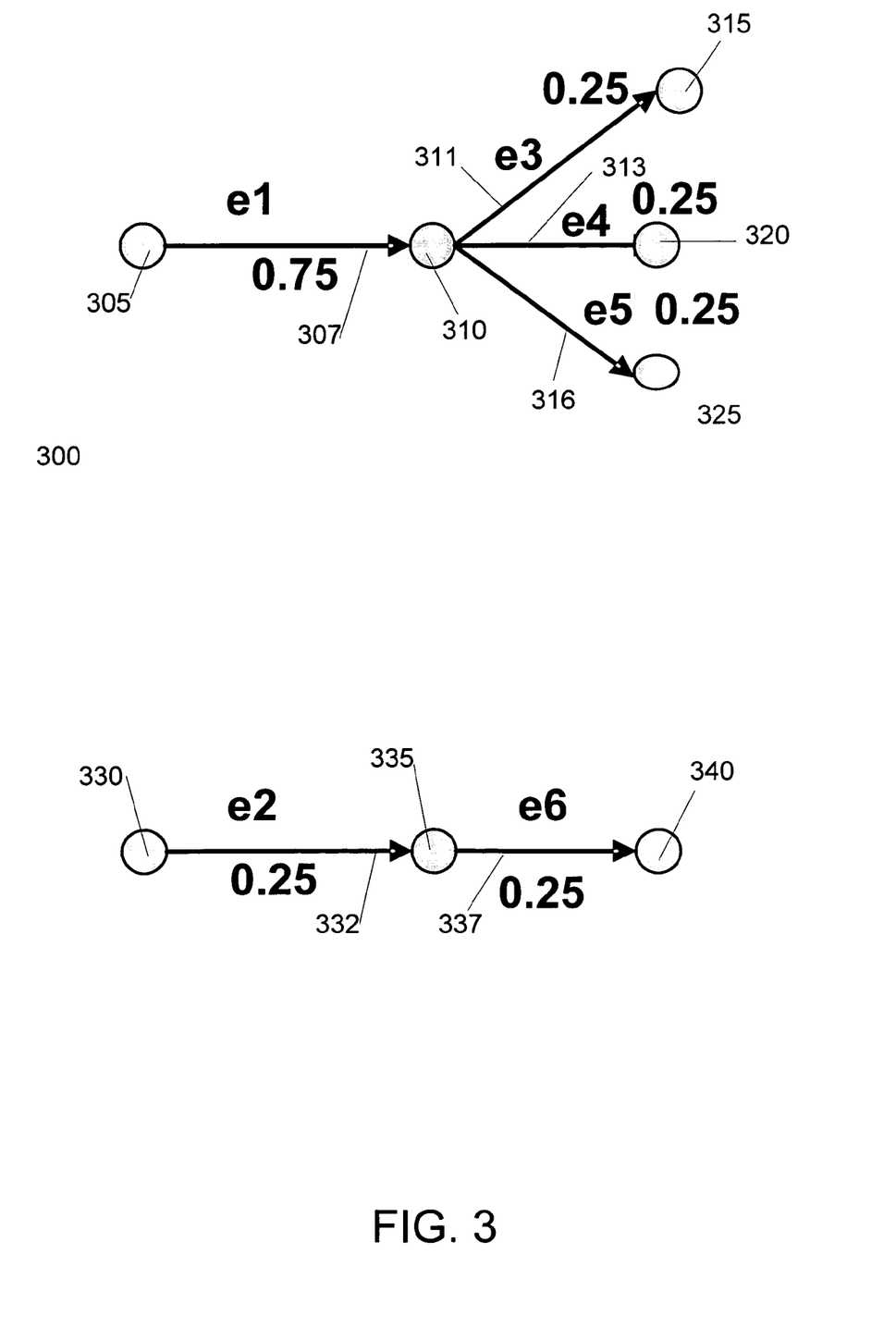
FIG. 3 illustrates an example application of a timing cost function according to an embodiment of the invention.

FIG. 3 illustrates an example 300 of statistical criticality for use in a timing cost function according to an embodiment of the invention. In this example, all edges are assumed to have the same delay and variance values. However, the statistical criticality of edges with different delay and variance values can be determined similarly.

Example 300 includes nodes and edges defining four different signal paths. A first signal path is between nodes 305 and 315 and includes node 310 and edges 307 and 311. A second signal path is between nodes 305 and 320 and includes node 310 and edges 307 and 313. A third signal path is between nodes 305 and 320 and includes node 310 and edges 307 and 316. A fourth signal path is between nodes 330 and 340 and includes node 335 and edges 332 and 337.

In example 300, edge 307 is included in three of the four signal paths. Thus, assuming the timing characteristics of each signal path are the same, edge 307 has a 75% (3 out of 4) chance of being part of a critical path. Thus, edge 307 statistical criticality value is 0.75. Similarly, edges 311, 313, 316, 332, and 337 are each included in only one of the four signal paths, therefore these edges have statistical criticality values of 0.25. In contrast, prior placement techniques would consider all of these edges equally likely to be on a critical path and thus optimize these edges equally. For purposes of illustration, this example assumes that edges have the same delay and variance properties. In practice, each element (or class of delay elements) typically has different delay and variance properties, as a result of individually characterizing the statistical delays as described above.

Additionally, the embodiment of the timing cost equation discussed above includes a criticality exponent. In an embodiment, the value of the criticality exponent is set based on an evaluation of sample designs to be implemented using a given programmable device architecture. In this embodiment, a set of sample designs is compiled several times using the above-described placement algorithm and different values of the criticality exponent. For each value of the criticality exponent, the set of compiled designs are analyzed to determine the geometric mean and standard deviation of the critical path delay. The criticality exponent value providing the minimum mean delay value is selected for future use with user designs. If the architecture of the programmable device or the types of designs to be compiled is changed, the value of the criticality exponent can be reevaluated. In some applications, a criticality exponent value of approximately 0.3 provides good results. However, this value may differ depending upon the architecture of the device and the characteristics of a representative sample of designs.

As discussed above, previous compilation processes attempted to identify and optimize the single worst-case timing critical path. These previous compilation techniques ignored the variations of timing delays (or other attributes) in paths due to manufacturing and environmental factors. Additionally, these previous compilation techniques ignored paths with near-critical timing delay values. Due to timing delay variation, these near-critical paths could have attributes matching or exceeding the attribute values of the identified worst-case critical path. Thus, the yield of devices meeting timing and other requirements will be reduced in several ways.

Figure 4:
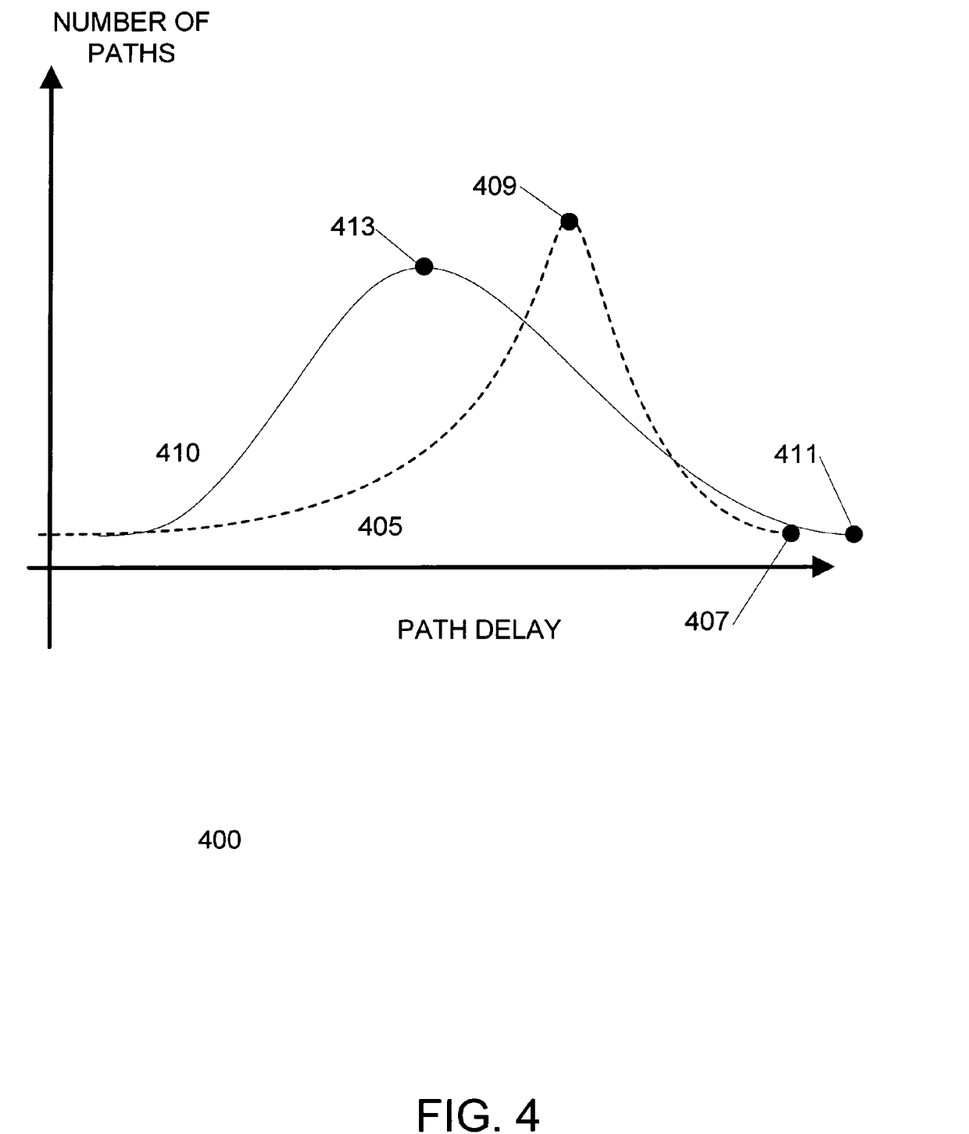
FIG. 4 illustrates improved timing yields as a result of an example application of an embodiment of the invention.

FIG. 4 illustrates an example 400 of improved timing yields as a result of an example application of an embodiment of the invention. Example 400 is a distribution of path delay values for an example design. Using prior compilation techniques, a distribution 405 may result. This distribution 405 includes a critical path delay value 407. As can be seen from this example, distribution 405 includes a large number of near-critical paths, as indicated by the location of peak 409 of distribution 405 near the critical path delay value 407.

In contrast, compiling an example design according to an embodiment of the invention may result in an example delay value distribution 410. This distribution 410 includes a critical path delay value 411. Delay value distribution 410 includes fewer near-critical delay paths, as indicated by the location of peak 413 of distribution 410 located further away from its critical path delay value 411. In this example, though not in all cases, the critical path delay value 411 resulting from compilation according to an embodiment of the invention may be greater than the critical path delay value 407 resulting from prior compilation techniques. However, because embodiments of the invention produce designs with fewer near-critical paths, the overall yield of devices satisfying timing and other design requirements increases.

Additionally, embodiment of the invention provide smaller yield loss than prior compilation techniques using similar guard band factors. This occurs because embodiments of the invention essentially considers timing analysis as determining a guard band for the statistical sum of edges in a path, rather than determining a sum of guard bands for individual edges in a path.

Speed-binning is often used to evaluate devices. In speed-binning, manufactured devices are tested and classified according to their performance characteristics. Customers can purchase devices from the classification best suited to their needs. For example, devices can be tested for speed and the fastest 40% (or some other percentage) of devices sold as high speed parts, the next 30% of devices sold as medium speed devices, and the remainder of devices sold as low speed devices.

Typically, speed-binning does not test all of the elements of the device. Instead, one or a small number of paths of the device are tested to determine each device's classification. For example, devices for which the test path(s) operate in 10 ns may be placed in the fast bin, and devices that operate in 10 ns to 12 ns As a result, speed-binning only takes into account global variations of devices, which are variations that are constant over each device, wafer, or manufacturing lot. Speed-binning does not take into account local variations of devices, which are variations of attributes, such as timing delays, between different portions of a device. Thus, some devices classified within a given speed classification may still fail to operate correctly, depending upon the local variations of the device and the requirements of a given design.

Embodiments of the invention can account for local variations in a number of ways. First, because both local and global variations of the elements of a device are determined for use the statistical static timing analysis, this variance data can also be used to determine a yield of a design for a given classification. The compilation software can then present users with yield predictions of their design implemented using devices with different speed classifications. Additionally, an embodiment of the compilation software can allow the user to increase or decrease guard band margins for paths (as opposed to individual edges) in the design and present corresponding yield predictions. This enables designers to select devices in a speed classification according to their performance and reliability requirements. For example, a consumer electronics design might require high speed operation but also allow for a relatively large yield failure rate. A user may select a medium speed classification of devices to implement their design to reduce costs if the yield failure rate is still acceptable. For designs with high reliability requirements, the user may instead choose to select a high speed classification of devices to ensure a lower yield failure rate.

In an embodiment, yields for an implementation of a design using different speed classifications of devices can be determined as follows. First, a device is categorized into groups based on the global variation of timing delays of a device. In some implementation, the global variation of timing delays of a device can be approximated by measuring or calculating the average local timing delay of one or more test paths of a devices. The cut-off delay values are calculated for each speed classification of the device. In an embodiment, to determine the timing yield for a speed classification, the probability density function of circuit delay for a design, as determined using the statistical timing analysis techniques described above, is numerically integrated over the global variation categorization, taking into account the cut-off delay values. For a given device speed classification k with lower and upper delay bounds of [$G^{low}(k)$, $G^{up}(k)$] and a relaxed cut-off delay $\gamma T_{bin}(k)$, the timing yield for this speed classification can be expressed as:

$$\text{timing\_yield}(k) = \int_{G^{low}(k)}^{G^{up}(k)} pdf(\Delta G_a) cdf\left(\frac{\gamma T_{bin}(k) - (T_\mu + \sigma_{T_g}\Delta G_a)}{\sigma_{TI}}\right) d\Delta G_a$$

Although the invention is described above with reference to a simulated annealing algorithm for the placement phase of compilation, alternate embodiments of the invention can be implemented using different compilation algorithms and in different compilation phases. Example placement algorithms may include any timing-driven placement algorithms that leverage static timing analysis, such as recursive partitioning, simultaneous clustering and placement, and graph embedding based placement.

Also, embodiments of the invention can be similarly applied to the clustering and routing phases of compilation. For the clustering phase, the cost function for wiring and timing cost is modified to assign a low cost to edges between nodes within the same atom or partition of the design and a high cost to edges between nodes in different atoms. For a routing phase, an embodiment of the invention uses similar cost functions as that in placement. However, in this phase, the locations of nodes are fixed and the compilation phase assigns cost values based on the specific wires assigned to signal paths.

Figure 5:
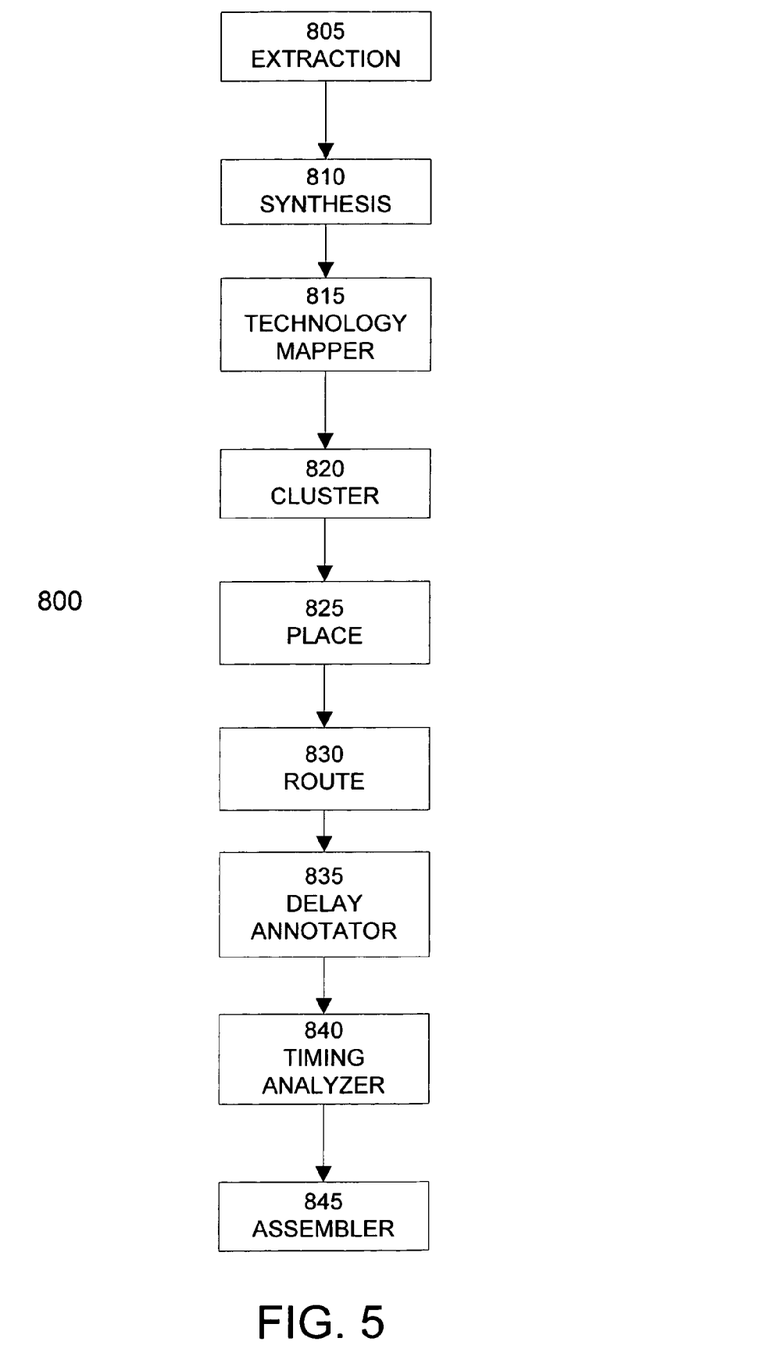
FIG. 5 illustrates an example compilation flow suitable for use with an embodiment of the invention.

FIG. 5 illustrates an example compilation process 800 suitable for use with an embodiment of the invention. The compilation process 800 converts a user design into a programmable device configuration adapted to configure a programmable device to implement the user design. The extraction phase 805 converts a description of the user design, expressed for example in a hardware description language, into a register transfer layer description.

Synthesis phase 810 converts the register transfer layer description of the user design into a set of logic gates. Technology mapping phase 815 subdivides the set of logic gates into a set of atoms, which are groups of logic gates matching the capabilities of the logic cells or other functional blocks of the programmable device. A given user design may be converted into any number of different sets of atoms, depending upon the underlying hardware of the programmable device used to implement the user design. For other types of devices, technology mapping phase 815 and the cluster phase 820, discussed below, may be omitted or replaced with other compilation phases specific to the type of device.

Following the technology mapping phase 815, the cluster phase 820 groups related atoms together into clusters. The placement phase 825 assigns clusters of atoms to locations on the programmable device. The route phase 830 determines the configuration of the configurable switching circuit of the programmable device used to connect the atoms implementing the user design.

The delay annotator phase 835 determines the signal delays for the set of atoms and their associated connections in the configurable switching circuit using a timing model of the programmable device. The timing analysis phase 840 determines the maximum operating speed of the programmable device when implementing the user design, for example by determining the portions of the user design have the largest signal delay.

The assembler phase 845 generates a set of configuration information specifying the configuration of the programmable device implementing the user design, including the configuration of each of the logic cells used to implement the user design and the configuration of the configurable switching circuit used to connect the logic cells. The assembler phase 845 can write the configuration information to a configuration file, which can then be used to configure one or more programmable devices to implement instances of the user design.

Figure 6:
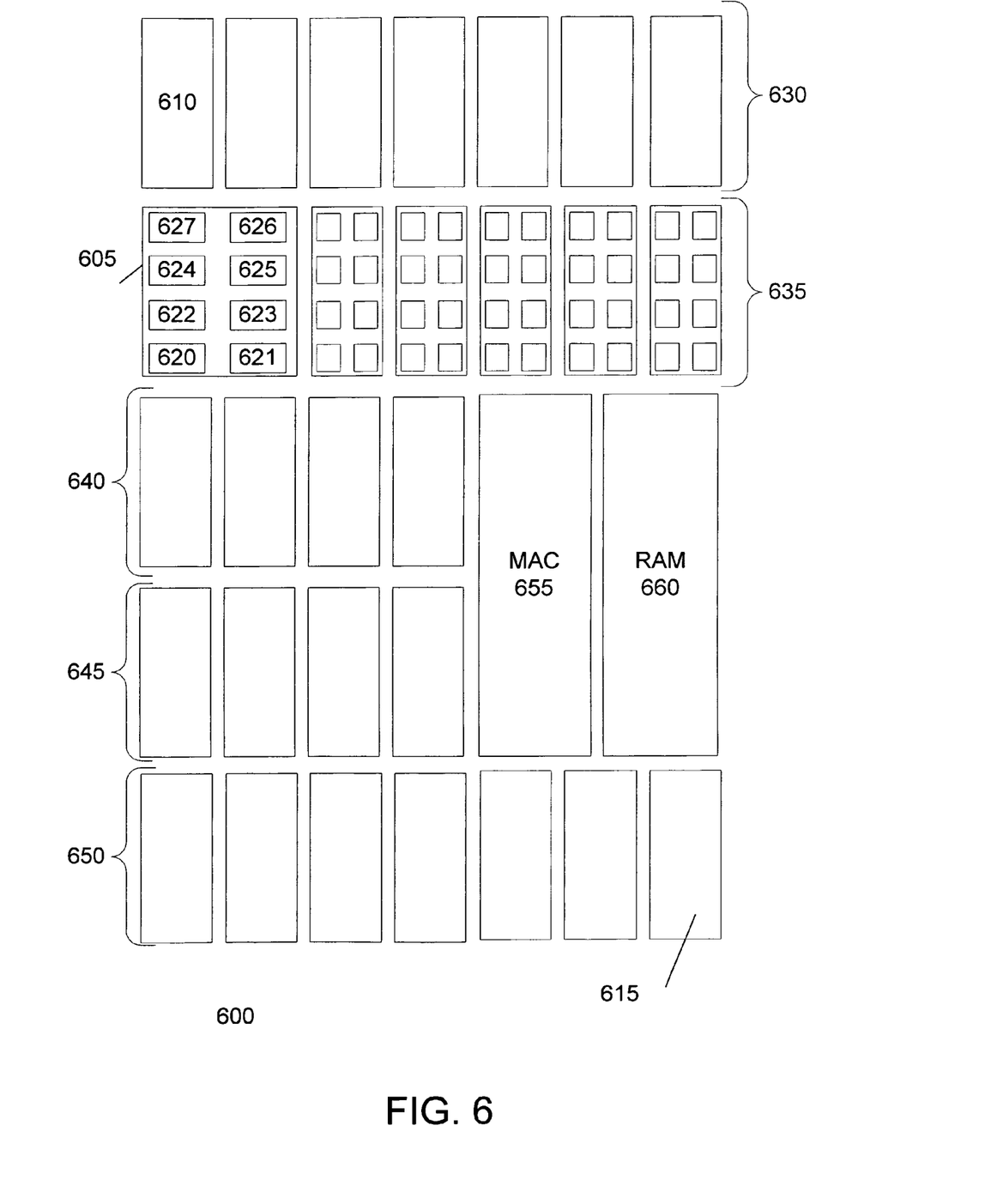
FIG. 6 illustrates an example programmable device suitable for implementing designs processed by embodiments of the invention.

FIG. 6 illustrates an example computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, and embodiments of the herein described invention. Further embodiments of computer 1200 can include specialized input, output, and communications subsystems for configuring, operating, testing, and communicating with programmable devices. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 7:
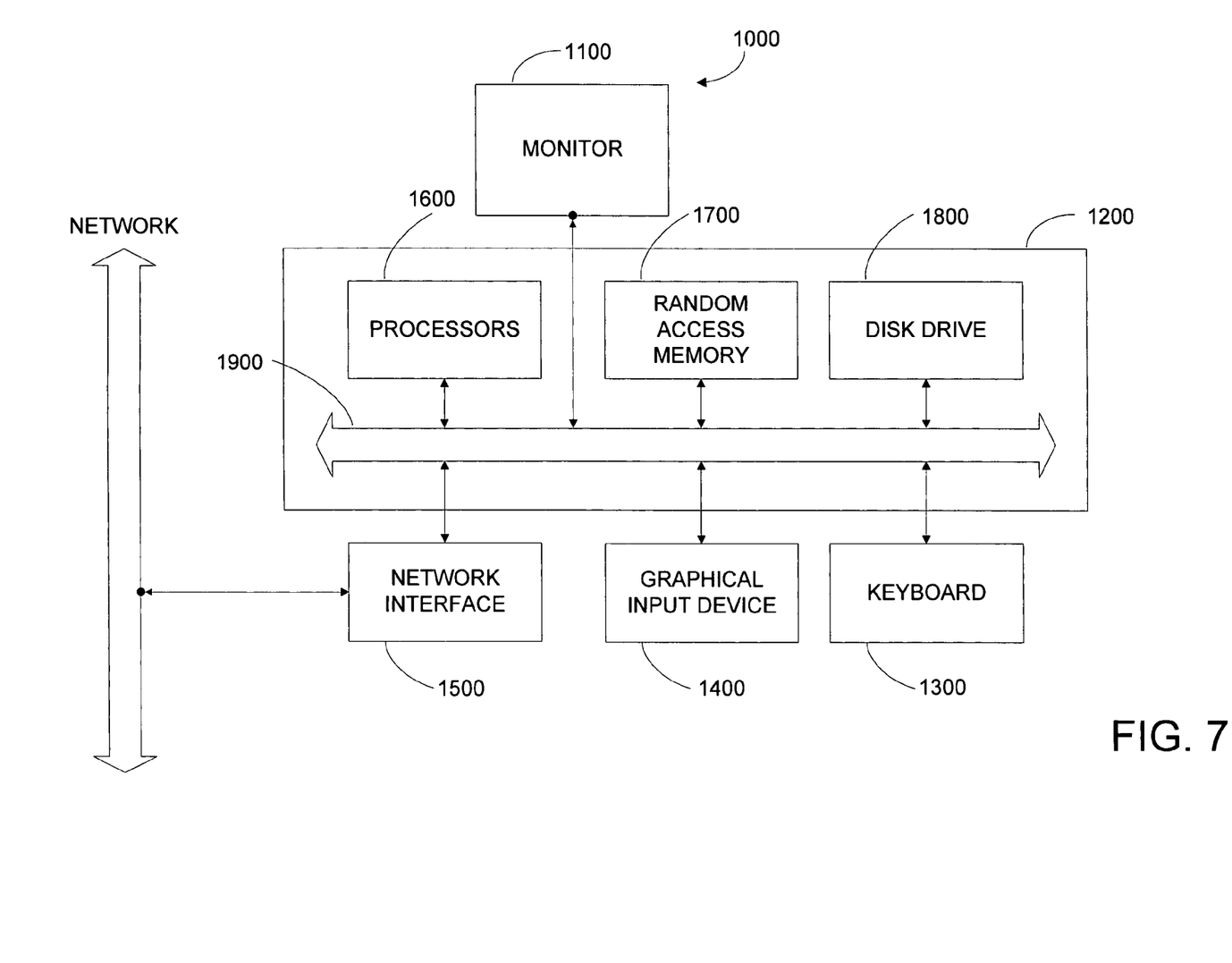
FIG. 7 illustrates a computer system suitable for implementing an embodiment of the invention.

FIG. 7 illustrates an example programmable device 900 suitable for implementing a user design processed with an embodiment of the invention. Programmable device 900 includes a number of logic array blocks (LABs), such as LABs 905, 910, 915. Each LAB includes a number of programmable logic cells using logic gates and/or look-up tables to perform a logic operation. LAB 905 illustrates in detail logic cells 920, 921, 922, 923, 924, 925, 926, and 927. Logic cells are omitted from other LABs in FIG. 9 for clarity. The LABs of device 900 are arranged into rows 930, 935, 940, 945, and 950. In an embodiment, the arrangement of logic cells within a LAB and of LABs within rows provides a hierarchical system of configurable connections, in which connections between logic cells within a LAB, between cells in different LABs in the same row, and between cell in LABs in different rows require progressively more resources and operate less efficiently.

In addition to logic cells arranged in LABs, programmable device 900 also include specialized functional blocks, such as multiply and accumulate block (MAC) 955 and random access memory block (RAM) 960. For clarity, the portion of the programmable device 900 shown in FIG. 7 only includes a small number of logic cells, LABs, and functional blocks. Typical programmable devices will include thousands or tens of thousands of these elements.

Further embodiments can be envisioned to one of ordinary skill in the art after reading the attached documents. For example, although the invention has been discussed with reference to programmable devices, it is equally applicable to logic minimization applications used to design any type of digital device, such as standard or structured ASICs, gate arrays, and general digital logic devices. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of determining an implementation of a design on an integrated circuit device, the method comprising:
    determining statistics of attributes of elements of the device, wherein the statistics comprise a probability distribution function (PDF) of a timing delay for each interconnect in a signal path of the design;
    determining configuration information specifying at least a portion of a configuration of the design on the device, wherein the configuration of the design associates portions of the design with at least a portion of the elements of the device;
    evaluating a suitability of the configuration according to at least one design criteria using the statistics of the attributes of the associated elements of the device, wherein the statistics comprise a statistical criticality value that provides a probability that an interconnect is included in a critical path, and wherein the probability that an interconnect is included in a critical path is derived from the PDF of the timing delay for that interconnect,
    wherein evaluating the suitability of the configuration comprises determining a cost function value for the configuration based on the configuration information and the statistics of the attributes of the associated elements of the device and wherein the cost function includes the statistical criticality value for each interconnect of the signal path; and
    selecting the configuration information in response to the configuration satisfying the at least one design criteria.

2. The method of claim 1, wherein the statistics of attributes include mean and standard deviation values of an attribute of elements.

3. The method of claim 1, wherein the attributes of elements of the device include a timing attribute.

4. The method of claim 3, wherein the timing attribute includes a timing slack value.

5. The method of claim 1, wherein the attributes of elements of the device include a power consumption attribute.

6. The method of claim 5, wherein the timing attribute includes a signal path switching probability.

7. The method of claim 1, wherein the configuration information specifies the placement of portions of the design in locations on the device.

8. The method of claim 1, wherein the configuration information specifies the clustering of portions of the design in atoms on the device.

9. The method of claim 1, wherein the configuration information specifies the routing of signal paths between portions of the design on the device.

10. The method of claim 1, wherein the cost function includes a variance of the statistical criticality value, thereby defining a probability distribution function of the criticality of the signal path.

11. The method of claim 1, wherein the probability distribution function of the criticality of the signal path is based on the statistical sum and max functions of statistical criticality of edges of the signal path.

12. The method of claim 1, wherein the statistics are expressed in a first-order canonical form.

13. The method of claim 1, wherein the statistical are expressed as a weighed sum of variations of the attributes of elements and a random variable.

14. The method of claim 1, wherein evaluating the suitability of the configuration according to at least one design criteria further comprises comparing the cost function value for the configuration with a cost function value of a prior configuration; and wherein selecting the configuration information in response to the configuration satisfying the at least one design criteria comprises selecting the configuration if its cost function value is less than the cost function value of the prior configuration.

15. The method of claim 1, further comprising:
determining at least one predicted yield of the design using the device from the statistics of attributes of elements of the device and the configuration of the design associating the portions of the design with at least the portion of the elements of the device.

16. The method of claim 15, wherein the predicted yield is determined with respect to at least one predefined speed bin of the device.

17. The method of claim 15 wherein the predicted yield is determined with respect to a guard band defined for a probability distribution function of the criticality of a signal path of the design.

18. The method of claim 17 wherein the guard band is defined by a user.

19. The method of claim 1, wherein the device is a programmable device.

20. The method of claim 1, wherein the device is a structured ASIC.

21. The method of claim 1, wherein a critical path comprises the longest path delay time of the design that satisfies the design criteria.

22. A method of determining an implementation of a design on an integrated circuit device, the method comprising:
(a) determining statistics of attributes of elements of the device;
(b) determining an initial configuration of at least a portion of the design on the device, wherein the initial configuration of the design associates portions of the design with at least a portion of the elements of the device;
(c) modifying the initial configuration to create a modified configuration of at least a portion of the device, wherein (c) comprises determining cost function values for the configurations based on the statistics of the attributes of the associated elements of the device, wherein the cost function includes statistical criticality values that provide probabilities that interconnects are included in a critical path of the design;
(d) comparing the initial configuration with the modified configuration using the cost function values; and
(e) based on the comparison, selecting the modified configuration in response to a determination that the modified configuration satisfies at least one design criteria better than the initial configuration.

23. The method of claim 22, further comprising:
replacing the initial configuration with the modified configuration in response to the determination that the modified configuration satisfies the at least one design criteria better than the initial configuration; and
repeating (c), (d), and (e) to compare a second modified configuration with the modified configuration.

24. The method of claim 22, wherein the statistics of attributes include mean and standard deviation values of an attribute of elements.

25. The method of claim 22, wherein the attributes of elements of the device include a timing attribute.

26. The method of claim 25, wherein the timing attribute includes a timing slack value.

27. The method of claim 22, wherein the attributes of elements of the device include a power consumption attribute.

28. The method of claim 27, wherein the timing attribute includes a signal path switching probability.

29. The method of claim 22, wherein the configurations specify the placement of portions of the design in locations on the device.

30. The method of claim 22, wherein the configurations specify the clustering of portions of the design in atoms on the device.

31. The method of claim 22, wherein the configurations specify the routing of signal paths between portions of the design on the device.

32. The method of claim 22, wherein the cost function includes variances of the statistical criticality values, thereby defining probability distribution functions of the criticality of the signal paths.

33. The method of claim 32, wherein the probability distribution functions of the criticality of the signal paths are based on the statistical sum and max functions of statistical criticality of edges of the signal paths.

34. The method of claim 22, further comprising:
determining at least one predicted yield of the design using the device from the statistics of attributes of elements of the device and the modified configuration of the design associating the portions of the design with at least the portion of the elements of the device.

35. The method of claim 34, wherein the predicted yield is determined with respect to at least one predefined speed bin of the device.

36. The method of claim 34 wherein the predicted yield is determined with respect to a guard band defined for a probability distribution function of the criticality of a signal path of the design.

37. A computer readable medium including instructions adapted to direct a computer to perform a method comprising:
determining statistics of attributes of elements of the device, wherein the statistics comprise a probability distribution function (PDF) of a timing delay for each interconnect in a signal path of the design;
determining configuration information specifying at least a portion of a configuration of the design on the device, wherein the configuration of the design associates portions of the design with at least a portion of the elements of the device;
evaluating a suitability of the configuration according to at least one design criteria using the statistics of the attributes of the associated elements of the device, wherein the statistics comprise a statistical criticality value that provides a probability that an interconnect is included in a critical path, and wherein the probability that an interconnect is included in a critical path is derived from the PDF of the timing delay for that interconnect,
wherein evaluating the suitability of the configuration comprises determining a cost function value for the configuration based on the configuration information and the statistics of the attributes of the associated elements of the device, and wherein the cost function includes the statistical criticality value for each interconnect of the signal path; and
selecting the configuration information in response to the configuration satisfying the at least one design criteria.

* * * * *